United States Patent Office 3,446,613
Patented May 27, 1969

---

3,446,613
N-ALKANOYLOXYPHENOXYALKANAMIDES AS HERBICIDES
Jordan P. Berliner and Sidney B. Richter, Chicago, Ill., assignors to Velsicol Chemical Corporation, Chicago, Ill., a corporation of Illinois
No Drawing. Filed Aug. 31, 1964, Ser. No. 393,339
Int. Cl. A01n 9/20; C07c 103/32
U.S. Cl. 71—118   7 Claims

ABSTRACT OF THE DISCLOSURE

A method of controlling undesirable plant life which comprises applying to the locus of the undesirable plant infestation a herbicidal composition comprising an inert carrier and, in a quantity which is herbicidally toxic to said undesirable plant life, a compound of the formula

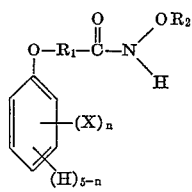

wherein $n$ is an integer from 1 to 4; each X is independently selected from the group consisting of halogen and unsubstituted lower alkyl; $R_1$ is an unsubstituted alkylene; containing from 1 to 4 carbon atoms and $R_2$ is lower acyl.

---

This invention relates to the control of undesirable pests. More specifically, this invention relates to the control of undesirable plant life with chemical compounds of the formula

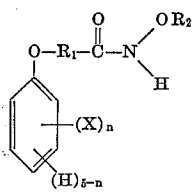

wherein $n$ is an integer from 1 to 4; each X is independently selected from the group consisting of halogen and unsubstituted lower alkyl; $R_1$ is an unsubstituted alkylene; and $R_2$ is lower acyl. It is preferred that $n$ be an integer from 1 to 4; each to be independently selected from the group consisting of halogen and unsubstituted lower alkyl containing from 1 to 3 carbon atoms, $R_1$ be unsubstituted alkylene containing from 1 to 4 carbon atoms; and $R_2$ be lower acyl containing 1 to 10 carbon atoms. It is further preferred that $R_2$ be lower acyl containing from 1 to 5 carbon atoms; and X and $R_1$ be as described above and the X's be positioned on the ring at the 2, the 4, the 2,4, or the 2,4,5-positions. It is most preferred that $R_1$ be methylene, $R_2$ be acetyl and the X's positioned on the ring at the 2,4-positions be independently selected from the group consisting of chlorine and unsubstituted lower alkyl.

Prior to the present invention many organic and inorganic substances have been proposed and used in attempts to control undesirable plants. While several of these substances were partially successful, the problem of controlling the vast number of species of undesirable plant life still exists. Some of the previously proposed substances are toxic to only a few species of plant life, while others are excessively toxic and indiscriminately destroy both desirable and undesirable plant life. Moreover, a great number of the prior substances are ineffective as herbicides, while a number are toxic to animal life. Thus, although many substances have heretofore been proposed as herbicides, the problem of the effective and selective control of undesirable plant life still exists. Therefore, one object of the present invention is the control of undesirable plant life.

Another object of the present invention is to provide a method for the control of undesirable plant life.

These and other objects of the present invention will be readily apparent from the ensuing description.

Unexpectedly it has been found that the amides used in the method of the present invention exhibit the desired control of undesirable plant life. Exemplary of amides which can be used in this method are: N-acetoxy-4-chloro-2-methylphenoxyacetamide, N-acetoxy-2,4-dichlorophenoxyacetamide, N-acetoxy - 2,4 - dimethylphenoxyacetamide, N-acetoxy - 2,4,5 - trichlorophenoxyacetamide, N-acetoxy-2,4-dichlorophenoxypropionamide, N-acetoxy-2,4 - dichlorophenoxybutyramide, N - propionyloxy - 2-methyl - 4 - chlorophenoxyacetamide, N-propionyloxy-2,4-dichlorophenoxyacetamide, N-propionyloxy-2,4,5-trichlorophenoxyacetamide, N-n-butyryloxy-2-methyl-4-chlorophenoxyacetamide, N-n-butyryloxy-2,4-dichlorophenoxyacetamide, N-isobutyryloxy - 2 - methyl-4-chlorophenoxyacetamide, N-isobutyryloxy - 2,4 - dichlorophenoxyacetamide, N-n-valeryloxy-2-methyl - 4 - chlorophenoxyacetamide, N-n-valeryloxy-2,4-dichlorophenoxyacetamide, and the like.

These amides can be prepared conveniently employing the corresponding acid as the starting material. This acid is often commercially available, or can be synthesized by treating the corresponding phenol with an alkali metal hydroxide to form a salt, and treating this salt with an acid of the formula $$\text{Hal—R}_1\text{—COOH}$$

wherein Hal is any of the group of halogens such as chlorine, bromine and the like, and $R_1$ is as described above. For example, when it is desired to prepare the 2-alkyl-4-chloro-ring substituted amides the starting materials, i.e., 2-alkyl - 4 - chlorophenoxyacetic acids, can be synthesized by treating the corresponding 2-alkyl-4-chlorophenol with an alkali metal hydroxide to form the salt, and treating the salt with an acid of the formula Hal—$R_1$—COOH, wherein Hal and $R_1$ are as described above to yield the desired free acid.

Examples of suitable free acids from which the compounds of the present invention can be prepared are:

2-methyl-4-chlorophenoxy acetic acid,
2,4-dichlorophenoxy acetic acid,
2,4,5-trichlorophenoxy acetic acid,
2,4-dimethylphenoxy acetic acid,
2,3,5,6-tetrachlorophenoxy acetic acid,
α-(2-methyl-4-chlorophenoxy)propionic acid,
α-(2-methyl-4-chlorophenoxy)-n-butyric acid,
γ-(2-methyl-4-chlorophenoxy)isobutyric acid,
α-(2,4,5-trichlorophenoxy)propionic acid,
α-(2,4-dimethylphenoxy)propionic acid,
α-(2,4-dichlorophenoxy)propionic acid, and the like.

The free acid can be converted to its acid chloride or ester, which is then treated with a suitable amine of the formula:

$$\text{H}_2\text{NOY}$$

wherein Y is H or lower acyl, to give the desired products of the present invention. Amines suitable for use in the method of the present invention can be prepared by methods described in Jones and Major, J. Am. Chem. Soc., vol. 52, pp. 669–79 (1930), and Major and Fleck, J. Am. Chem. Soc., vol. 50, pp. 1479–81 (1928). Exemplary of suitable amines useful as reactants in the present invention are:

hydroxylamine,
O-acetylhydroxylamine,
O-propionylhydroxylamine,
O-n-butyrylhydroxylamine,
O-isobutyrylhydroxylamine,
O-valerylhydroxylamine,
O-caproylhydroxylamine, and the like.

For purposes of the present invention, it is preferable to use the hydrochlorides of the amines in the presence of a base such as potassium carbonate, sodium hydroxide, and potassium hydroxide.

More particularly, the free acid, dissolved in about 10 parts by weight of a solvent such as acetone per part of the free acid, can be treated with an equimolar or greater quantity of dimethyl sulfate in the presence of a base such as potassium carbonate, which is present in an amount about equimolar with the dimethyl sulfate concentration. The treatment is performed with heating for several hours, preferably at reflux. The corresponding ester thus formed can be isolated from the reaction mixture by means common to the art, such as by filtration, distillation, and the like.

In the next step, the ester can be reacted with a suitable amine such as hydroxylamine or the amine hydrochloride. This reaction is accomplished by dissolving the hydroxylamine or the hydroxylamine hydrochloride in about 5 parts by weight of a solvent such as methanol in the presence of a base such as potassium hydroxide. The base solution and the ester are combined with cooling to keep the exothermic reaction at about room temperature. The product is recovered from this reaction by common physical means. This product can then be treated with about an equimolar amount of a suitable acyl halide in the presence of a solvent such as dioxane which is present in a concentration of about 8 parts by weight to 1 part of the above product. The reaction mixture is heated for several hours preferably at about reflux temperature and then added to water. After this dilution, the final product can be recovered by methods known to the art such as crystallization, filtration and the like.

The manner in which the compounds used in the method of the present invention can be prepared is illustrated in the following examples.

EXAMPLE 1

Preparation of methyl (4-chloro-2-methyl-phenoxy)acetate

A solution of 4-chloro-2-methylphenoxyacetic acid (293.5 g.; 1.464 moles) in acetone (3 l.) was placed in a 5 l., 3-necked round-bottom flask fitted with a mechanical stirrer, reflux condenser and a dropping funnel. Potassium carbonate (222.2 g.; 1.61 moles) was added to this solution and the mixture was stirred. Upon the addition of the potassium carbonate, a solid mass formed which broke up when cut apart with a spatula and heated. Dimethyl sulfate (153 ml.; 1.61 moles) was added slowly with stirring and heating at reflux. The stirring and heating were continued for six hours. The reaction mixture was filtered and the filter cake was washed three times with acetone. The washings and filtrate were combined and distilled under aspirator pressure to remove the solvent and a brown liquid was obtained. This liquid was taken up in ether and extracted three times with 10% sodium carbonate. The ether solution was dried over magnesium sulfate, filtered, and evaporated on a steam bath, leaving a dark brown liquid. This liquid was vacuum distilled to yield methyl (4-chloro-2-methylphenoxy) acetate, as a clear colorless liquid.

EXAMPLE 2

Preparation of potassium (4-chloro-2-methyl-phenoxy)acetohydroxamate

Separate solutions of hydroxylamine hydrochloride (67.8 g.; 0.976 mole) dissolved in absolute methanol (347 ml.) and potassium hydroxide (96.6 g.; 1.464 moles) also dissolved in absolute methanol (241 ml.) were prepared at the boiling point of the solvent (64.7° C.). Both solutions were cooled to room temperature and the alkali solution was added to the hydroxylamine solution with stirring and periodic cooling in an ice bath. After all the alkali had been added, the mixture was allowed to stand in the ice bath for 5 minutes after which the potassium chloride precipitate was filtered out. The filter cake was washed with methanol and the washings were combined with the filtrate. Methyl (4-chloro-2-methylphenoxy) acetate (104.7 g.; 0.488 mole) was then added with stirring to this solution. The reaction mixture was placed in an Erlenmeyer flask and allowed to stand at room temperature overnight. The solution which had turned cloudy was then refrigerated for 72 hours and a solid crystallized. This solid was filtered, washed with pentane and air dried. The mother liquor was concentrated using a rotary evaporator, seeded with a few crystals and placed in an ice bath. A solid crystallized out of the solution and was filtered, washed with pentane, air dried and combined with the crystals obtained above. The combined solids were potassium (4-chloro-2-methylphenoxy)acetohydroxamate.

EXAMPLE 3

Preparation of N-acetoxy-4-chloro-2-methylphenoxy-acetamide

A suspension of finely powdered potassium (4-chloro-2-methylphenoxy)acetohydroxamate (19.8 g.; 0.078 mole) in dioxane (100 ml.) was placed in a 300 ml. three-necked flask fitted with a stirrer, condenser, and addition funnel. To this mixture acetyl chloride (6.1 g.; 0.078 mole) was added with stirring. The addition was mildly exothermic. The reaction mixture was stirred and heated at reflux for 30 minutes after which the mixture was stirred as it cooled to room temperature. This reaction mixture was slowly added to distilled water (1 l.) and a white solid formed. The solid was filtered and washed with water and then dissolved in benzene. Upon treatment of the benzene solution with pentane, a solid formed which was filtered, washed with pentane, and air dried. The solid was then dissolved in ether and the ether solution was dried over magnesium sulfate, filtered, and evaporated on a steam bath to yield a white solid. The product was recrystallized from benzene-pentane, washed with pentane and air dried to yield N-acetoxy-4-chloro-2-methyl-phenoxyacetamide, M.P. 108.5°–110° C.

Analysis for $C_{11}H_{12}ClNO_4$: Theory: C, 51.26; H, 4.66; Cl, 13.79%. Found: C, 51.58; H, 4.99; Cl, 13.79%.

EXAMPLE 4

Preparation of N-acetoxy-2,4-dichlorophenoxyacetamide 2,4-dichlorophenoxyacetic acid (321.7 g.; 1.46 moles) is reacted with dimethyl sulfate (153 ml.; 1.61 moles) in the presence of potassium carbonate (222.2 g.; 1.61 moles) and acetone by the procedure of Example 1. The product (234 g.; 1.00 mole) of this reaction is then treated with hydroxylamine hydrochloride (138 g.; 2.00 moles) and potassium hydroxide (168 g.; 3.00 moles) by the procedure of Example 2 and this product (136 g.; 0.50 mole) is reacted, by the procedure of Example 3, with acetyl chloride (39 g.; 0.50 mole) to yield N-acetoxy-2,4-dichlorophenoxyacetamide,

EXAMPLE 5

Preparation of N-acetoxy-2,4-dimethylphenoxyacetamide 2,4-dimethylphenoxyacetic acid (263 g.; 1.46 moles) is reacted with dimethyl sulfate (153 ml.; 1.61 moles) in the presence of potassium carbonate (222.2 g.; 1.61 moles) and acetone by the procedure of Example 1. The product (194 g.; 1.00 mole) of this reaction is then treated with hydroxylamine hydrochloride (138 g.; 2.00 moles) and potassium hydroxide (168 g.; 3.00 moles) by the procedure of Example 2 and this product (166 g.; 0.50 mole) is reacted with acetyl chloride (39 g.; 0.50 mole) to yield N-acetoxy-2,4-dimethylphenoxyacetamide.

EXAMPLE 6

Preparation of N-acetoxy-2,4,5-trichlorophenoxyacetamide 2,4,5-trichlorophenoxyacetic acid (372 g.; 1.46 moles) is reacted with dimethyl sulfate (153 ml.; 1.61 moles) in the presence of potassium carbonate (222.2 g.; 1.61 moles) and acetone by the procedure of Example 1. The product (269 g.; 1.00 mole) of this reaction is then treated with hydroxylamine hydrochloride (138 g.; 2.00 moles) and potassium hydroxide (168 g.; 3.00 moles) by the procedure of Example 2 and this product (154 g.; 0.50 mole) is reacted with acetyl chloride (39 g.; 0.50 mole) to yield N-acetoxy-2,4,5-trichlorophenoxyacetamide.

Other compounds within the scope of the present invention can be prepared by the method detailed in the preceding examples. In the following examples, the free acid starting material, the amine and the acyl halide reactants which can be used to prepare the indicated named compounds of this invention are set forth.

EXAMPLE 7

2 - methyl - 4 - chlorophenoxyacetic acid+hydroxylamine+propionyl chloride=N - propionyloxy-2-methyl-4-chlorophenoxyacetamide.

EXAMPLE 8

2,4 - dichlorophenoxyacetic acid+hydroxylamine+propional chloride=N-propionyloxy - 2,4 - dichlorophenoxyacetamide.

EXAMPLE 9

2,4,5 - trichlorophenoxyacetic acid+hydroxylamine+propionyl chloride=N - propionyloxy-2,4,5-trichlorophenoxyacetamide.

EXAMPLE 10

2 - methyl - 4 - chlorophenoxyacetic acid+hydroxylamine+n-butyryl chloride=N - n - butyryloxy - 2-methyl-4-chlorophenoxyacetamide.

EXAMPLE 11

2,4 - dichlorophenoxyacetic acid+hydroxylamine+n-butyryl chloride=N-n-butyryloxy-2,4 - dichlorophenoxyacetamide.

EXAMPLE 12

2 - methyl - 4 - chlorophenoxyacetic acid+hydroxylamine+isobutyryl chloride=N - isobutyryloxy-2-methyl-4-chlorophenoxyacetamide.

EXAMPLE 13

2,4 - dichlorophenoxyacetic acid+hydroxylamine+isobutyryl chloride=N - isobutyryloxy - 2,4 - dichlorophenoxyacetamide.

For practical use as herbicides, the compounds of this invention are generally incorporated into herbicidal compositions which comprise an inert carrier and a herbicidally toxic amount of such a compound. Such herbicidal compositions, which are usually known in the art as formulations, enable the active compound to be applied conveniently to the site of the weed infestation in any desired quantity. These compositions can be solids such as dusts, granules, or wettable powders; or they can be liquids such as solutions or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, onto and into granulated carriers such as the attapulgites or the vermiculites, usually of a particle size range of from about 0.3 to 1.5 mm. Wettable powders, which can be dispersed in water to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. However, preferred liquid herbicidal compositions are emulsifiable concentrates, which comprise an active compound according to this invention and as the inert carrier, a solvent and an emulsifier. Such emulsifiable concentrates can be diluted with water to any desired concentration of active compound for application as sprays to the site of the weed infestation. The emulsifiers most commonly used in these concentrates are nonionic or mixtures of nonionic with anionic surface-active agents.

A typical herbicidal composition according to this invention is illustrated by the following example, in which the quantities are in parts by weight.

EXAMPLE 14

Preparation of a dust

Product of Example 3 _____ 10
Powdered talc _____ 90

The above ingredients are mixed in a mechanical grinder-blender and are ground until a homogeneous, free-flowing dust of the desired particle size is obtained. This dust is suitable for direct application to the site of the weed infestation.

The herbicides of this invention can be applied in any manner recognized by the art. The concentration of the new compounds of this invention in the herbicidal compositions will vary greatly with the type of formulation and the purpose for which it is designed, but generally the herbicidal compositions will comprise from about 0.05 to about 95 percent by weight of the active compounds of this invention. In a preferred embodiment of this invention, the herbicidal compositions will comprise from about 5 to about 75 percent by weight of the active compound. The compositions can also comprise such additional substances as other pesticides, spreaders, adhesives, stickers, fertilizers, activators, synergists, and the like.

Weeds are undesirable plants in their growing where they are not wanted, having no economic value, and interfering with the production of cultivated crops or with the welfare of livestock. Many types of weeds are known, including annuals such as pigweed, lanbsquarters, yellow foxtail, crabgrass, wild mustard, French-weed, ryegrass, goosegrass, chickweed, and smartweed; biennials such as wild carrot, great burdock, mullein, round-leaved mallow, blue thistle, bull thistle, hound's-tongue, moth mullein, and purple star thistle; or perennials such as white cockle, perennial ryegrass, quackgrass, Johnson grass, Canada thistle, hedge bindweed, Bermuda grass, sheep sorrel, field chickweed, and winter-cress. Similarly, such weeds can be classified as broad-leaf or grassy weeds. It is economically desirable to control the growth of such weeds without damaging beneficial plants or livestock.

The new compounds of this invention are particularly valuable for weed control because they are toxic to many species and groups of weeds while they are relatively nontoxic to many beneficial plants. The method of this invention for the control of weeds comprises contacting said weeds with a herbicidal composition comprising an inert carrier and as the essential active ingredient, in a quantity which is herbicidally toxic to said weeds, a compound of this invention. The exact amount of compound required will depend on a variety of factors, including the hardiness of the particular weed species, weather, method of application, the kind of beneficial plants in the same area, and the like. Thus, while the application of up to only about one or two ounces of an active compound per acre may be sufficient for good control of a light infestation of weeds growing under adverse conditions, the application of one pound or more of active compound per acre may be required for good control of a dense infestation of hardy weeds growing under favorable conditions.

The herbicidal toxicity of the new compounds of this invention can be illustrated by many of the established testing techniques known to the art. For example, emulsifiable concentrate compositions can be diluted with water to concentrations equivalent to 4 pounds of the active compound per acre. Duplicate paper pots filled with a sand and soil mixture are seeded with weeds; and immediately after seeding, the soil surface of each pot is sprayed with an appropriately diluted test solution.

The weed growth is maintained under artificial lighting with irrigation provided by placing the porous pots in a small amount of water in stainless steel trays. The weeds are observed for a week to ten days; and the percent kill, injury, and stand reduction are recorded. The results indicate a high order of herbicidal activity of the compounds of this invention. Comparable preplanting or post emergence tests can also be used.

The preemergence herbicidal activity of the compounds of the present invention was illustrated, for example, by a number of experiments carried out for the control of various weeds. In one series of tests, the test compounds formulated as aqueous emulsions were sprayed at various dosages on the surface of soil which had been seeded less than twenty-four hours earlier with seeds of crop plants and weeds. After spraying, the soil containers were placed in the greenhouse and provided with supplementary light and heat as required and daily or more frequent watering. The severity of injury to each weed was determined about 20 days after the soil treatments. The severity of injury was rated on a 0 to 10 scale as follows: 0=no injury; 1, 2=slight injury; 3, 4=moderate injury; 5, 6=moderately severe injury; 7, 8, 9=severe injury; 10=death. Results of these tests are presented in the following table:

TABLE I.—INJURY RATINGS

| Test plant | Concentration of N-acetoxy-4-chloro-2-methylphenoxyacetamide | | |
|---|---|---|---|
| | 1 lb. per acre | 2 lbs. per acre | 8 lbs. per acre |
| Crabgrass | 9 | 9 | 10 |
| Barnyard grass | 7 | 9 | 9 |
| Mustard | 9 | 9 | 10 |
| Pigweed | 9 | 10 | 10 |

Another series of tests which were run, shows the postemergence herbicidal activity of the compounds of this invention. The test compounds were formulated as aqueous emulsions and sprayed at various dosages on the foliage of weeds that had attained a prescribed size. After being sprayed the plants were placed in a greenhouse and watered either daily or more frequently. Water was not applied to the foliage of treated plants. The severity of injury to each weed was determined 13 days after the plants were treated. The degree of injury was rated on the same basis as in the aforementioned series of tests. Results of these tests are presented in the following table:

TABLE II.—INJURY RATINGS

| Test plant | Concentration of N-acetoxy-4-chloro-2-methylphenoxyacetamide | | |
|---|---|---|---|
| | 1 lb. per acre | 2 lbs. per acre | 3 lbs. per acre |
| Barnyard grass | 2 | 6 | 10 |
| Mustard | 9 | 10 | 10 |
| Pigweed | 7 | 10 | 10 |

We claim:
1. A method of controlling undesirable plant life which comprises applying to the locus of the undesirable plant infestation a herbicidal composition comprising an inert carrier and, in a quantity which is herbicidally toxic to said undesirable plant life, a compound of the formula

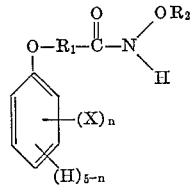

wherein $n$ is an integer from 1 to 4; each X is independently selected from the group consisting of halogen and unsubstituted lower alkyl; $R_1$ is an unsubstituted alkylene containing from 1 to 4 carbon atoms; and $R_2$ is lower acyl.

2. A method of controlling undesirable plant life which comprises applying to the locus of the undesirable plant infestation a herbicidal composition comprising an inert carrier and, in a quantity which is herbicidally toxic to said undesirable plant life, a compound of the formula

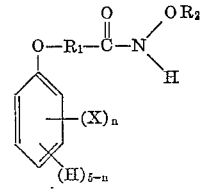

wherein $n$ is an integer from 1 to 4; each X is independently selected from the group consisting of halogen and unsubstituted lower alkyl containing from 1 to 3 carbon atoms, $R_1$ is an unsubstituted alkylene containing from 1 to 4 carbon atoms; and $R_2$ is lower acyl.

3. A method of controlling undesirable plant life which comprises applying to the locus of the undesirable plant infestation a herbicidal composition comprising an inert carrier and, in a quantity which is herbicidally toxic to said undesirable plant life, a compound of the formula

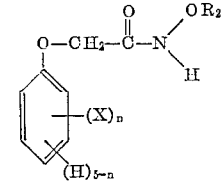

wherein $n$ is an integer from 1 to 4; each X is independently selected from the group consisting of halogen and unsubstituted lower alkyl containing from 1 to 3 carbon atoms, $R_2$ is lower acyl containing from 1 to 3 carbon atoms.

4. A method of controlling undesirable plant life which comprises applying to the locus of the undesirable plant infestation a herbicidal composition comprising an inert carrier and, in a quantity which is herbicidally toxic to said undesirable plant life, N-acetoxy-4-chloro - 2 - methylphenoxyacetamide.

5. A method of controlling undesirable plant life which comprises applying to the locus of the undesirable plant infestation a herbicidal composition comprising an inert carrier and, in a quantity which is herbicidally toxic to said undesirable plant life, N-acetoxy-2,4-dichlorophenoxyacetamide.

6. A method of controlling undesirable plant life which comprises applying to the locus of the undesirable plant infestation a herbicidal composition comprising an inert carrier and, in a quantity which is herbicidally toxic to said undesirable plant life, N-acetoxy - 2,4 - dimethylphenoxyacetamide.

7. A method of controlling undesirable plant life which comprises applying to the locus of the undesirable plant infestation a herbicidal composition comprising an inert carrier and, in a quantity which is herbicidally toxic to said undesirable plant life, N-acetoxy-2,4,5-trichlorophenoxyacetamide.

References Cited

UNITED STATES PATENTS

| | | | |
|---|---|---|---|
| 2,396,513 | 3/1946 | Jones | 71—2.6 |
| 2,412,510 | 12/1946 | Jones | 71—2.6 |
| 3,168,561 | 2/1965 | Richter | 71—2.6 |
| 3,236,871 | 2/1966 | Hinman et al. | 71—2.6 |

LEWIS GOTTS, *Primary Examiner.*

G. HOLLRAH, *Assistant Examiner.*

U.S. Cl. X.R.

71—113, 124; 260—473, 545